United States Patent
Dell'Amico et al.

(10) Patent No.: US 10,721,264 B1
(45) Date of Patent: *Jul. 21, 2020

(54) SYSTEMS AND METHODS FOR CATEGORIZING SECURITY INCIDENTS

(71) Applicant: Symantec Corporation, Mountain View, CA (US)

(72) Inventors: Matteo Dell'Amico, Valbonne (FR); Chris Gates, Culver City, CA (US); Michael Hart, Farmington, CT (US); Kevin Roundy, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,774

(22) Filed: Feb. 27, 2019

Related U.S. Application Data

(63) Continuation of application No. 15/292,918, filed on Oct. 13, 2016, now Pat. No. 10,341,377.

(51) Int. Cl.
  *H04L 29/06* (2006.01)
  *G06N 20/00* (2019.01)

(52) U.S. Cl.
  CPC ......... *H04L 63/1433* (2013.01); *G06N 20/00* (2019.01); *H04L 63/1441* (2013.01); *H04L 67/42* (2013.01)

(58) Field of Classification Search
  CPC ............. H04L 63/1425; H04L 63/1416; H04L 63/1441; H04L 63/14; G06N 99/005; G06N 3/08; G06F 17/30598
  USPC .............................................. 726/23, 24, 25
  See application file for complete search history.

(56) References Cited

U.S. PATENT DOCUMENTS

| | | | |
|---|---|---|---|
| 8,180,886 B2 | 5/2012 | Overcash | |
| 8,418,249 B1* | 4/2013 | Nucci | G06F 21/552 |
| | | | 706/20 |
| 8,898,784 B1 | 11/2014 | Alexander et al. | |
| 2002/0087882 A1 | 7/2002 | Schneier | |
| 2005/0039047 A1 | 2/2005 | Raikar et al. | |

(Continued)

OTHER PUBLICATIONS

Dell'Amico et al., "Systems and Methods for Categorizing Security Incidents", U.S. Appl. No. 15/292,918 dated Oct. 13, 2016, 78 pages.

*Primary Examiner* — Taghi T Arani
*Assistant Examiner* — Lin Chang
(74) *Attorney, Agent, or Firm* — FisherBroyles, LLP

(57) ABSTRACT

The disclosed computer-implemented method for categorizing security incidents may include (i) generating, within a training dataset, a feature vector for each of a group of security incidents, the feature vector including features that describe the security incidents and the features including categories that were previously assigned to the security incidents as labels to describe the security incidents, (ii) training a supervised machine learning function on the training dataset such that the supervised machine learning function learns how to predict an assignment of future categories to future security incidents, (iii) assigning a category to a new security incident by applying the supervised machine learning function to a new feature vector that describes the new security incident, and (iv) notifying a client of the new security incident and the category assigned to the new security incident. Various other methods, systems, and computer-readable media are also disclosed.

20 Claims, 7 Drawing Sheets

(56) References Cited

U.S. PATENT DOCUMENTS

| | | |
|---|---|---|
| 2007/0101432 A1* | 5/2007 | Carpenter ............. G06F 21/552 |
| | | 726/25 |
| 2009/0327971 A1 | 12/2009 | Shostack et al. |
| 2012/0158626 A1* | 6/2012 | Zhu ......................... G06F 21/56 |
| | | 706/13 |
| 2012/0210423 A1* | 8/2012 | Friedrichs ............. G06F 21/564 |
| | | 726/22 |
| 2014/0143863 A1* | 5/2014 | Deb ....................... G06F 21/552 |
| | | 726/22 |
| 2015/0095332 A1 | 4/2015 | Beisiegel et al. |
| 2015/0319185 A1 | 11/2015 | Kirti et al. |
| 2016/0335432 A1* | 11/2016 | Vatamanu ............. G06F 21/552 |
| 2017/0118241 A1* | 4/2017 | Call ................... H04L 63/1441 |

* cited by examiner

Training Dataset 122

Security Incident 402
- HIGH SEVERITY
- Category: DOS Attack — Signature A ID
- Category: DOS Attack — Signature B ID — Category: Vulnerability Scan

Security Incident 404
- MEDIUM SEVERITY
- Category: Server Attack — Signature C ID
- Category: Server Attack — Signature B ID — Category: DOS Attack

Security Incident 406
- HIGH SEVERITY
- Category: Vulnerability Scan — Signature D ID
- Signature E ID

Security Incident 408
- LOW SEVERITY
- Category: Advertising Tracking — Signature F ID
- Signature G ID

Security Incident 410
- ?
- ? — Signature D ID
- Signature F ID

*FIG. 4*

SYSTEMS AND METHODS FOR CATEGORIZING SECURITY INCIDENTS

CROSS REFERENCE TO RELATED APPLICATION

This application is a continuation of U.S. application Ser. No. 15/292,918, filed on Oct. 13, 2016, the disclosure of which is incorporated, in its entirety, by this reference.

BACKGROUND

Individuals and organizations typically seek to protect their computing resources from attackers and malicious threats. In some examples, enterprise organizations may hire a computing security vendor to provide security services to protect corresponding computing resources. More specifically, some security vendors may deploy a variety of endpoint security products on client machines of associated customers. The endpoint security products may detect the triggering of signature matches on the client machines that indicate the potential presence of a security threat, such as an intrusion or infection. The security vendors may collect information about the signature matches on one or more backend security servers. Moreover, the security vendors may process and analyze the collected information to prepare one or more reports about potential security threats on the client machines, thereby helping to protect the customers from corresponding security threats. Accordingly, in some examples, security vendors may leverage insights gained from one customer to help protect another customer.

Nevertheless, a computing security vendor that maintains a sufficiently large database of information about detected signature matches, and/or that provides security services for a sufficiently large number of customers, may encounter situations where the number of potential security threats becomes difficult to manage. The instant disclosure, therefore, identifies and addresses a need for systems and methods for categorizing security incidents, as discussed further below.

SUMMARY

As will be described in greater detail below, the instant disclosure describes various systems and methods for categorizing security incidents. In one example, a computer-implemented method for categorizing security incidents may include (i) generating, within a training dataset, a feature vector for each of a group of security incidents, the feature vector including features that describe the security incidents and the features including categories that were previously assigned to the security incidents as labels to describe the security incidents, (ii) training a supervised machine learning function on the training dataset using the categories that were previously assigned to the security incidents such that the supervised machine learning function learns how to predict an assignment of future categories to future security incidents, (iii) assigning a category to a new security incident by applying the supervised machine learning function to a new feature vector that describes the new security incident to predict the category for the new security incident, and (iv) notifying a client, through an electronically transmitted security incident report, of the new security incident and the category assigned to the new security incident based on applying the supervised machine learning function to the feature vector that describes the new security incident to enable the client to perform a security action to protect itself from a corresponding security threat.

In one embodiment, the features of the feature vector further include an additional category that was previously assigned as an additional label to a threat signature alert that triggered in correspondence to a respective security incident. In some examples, identifying the additional category that was previously assigned as the additional label to the threat signature alert may include: (i) identifying a historical security incident to which the threat signature alert triggered in correspondence to the historical security incident without triggering any other categorized threat signature alert and (ii) leveraging a category that was previously assigned to the historical security incident as the additional category.

In some examples, identifying the additional category that was previously assigned as the additional label to the threat signature alert may include extracting the additional category from a multi-level hierarchical category taxonomy that assigns to the threat signature alert both the additional category and a sub-category under the additional category. In one embodiment, the features of the feature vector further include an identifier for a smoke detector threat signature alert that was not assigned a category based on the smoke detector threat signature alert indicating suspicious behavior on a client machine without indicating a cause of the suspicious behavior.

In some examples, applying the supervised machine learning function to the new feature vector that describes the new security incident results in assigning at least two categories to the new security incident. In some examples, assigning the categories to the new security incident may include prioritizing the category over a different category. In some examples, assigning the category to the new security incident is further based at least in part on an analysis of historical data indicating that the client responded more frequently to the category than the client responded to the different category. In some examples, training the supervised machine learning function on the training dataset may include establishing a data grid such that security incidents correspond to at least one of rows and columns of the data grid. In one embodiment, generating, within the training dataset, the feature vector for each of the group of security incidents may include one of: (i) eliminating security incidents that correspond to threat signature alerts that were previously categorized and (ii) eliminating security incidents that correspond to smoke detector threat signature alerts that were not previously categorized.

In one embodiment, a system for implementing the above-described method may include (i) a generation module, stored in memory, that generates, within a training dataset, a feature vector for each of a group of security incidents, the feature vector including features that describe the security incidents and the features including categories that were previously assigned to the security incidents as labels to describe the security incidents, (ii) a training module, stored in memory, that trains a supervised machine learning function on the training dataset using the categories that were previously assigned to the security incidents such that the supervised machine learning function learns how to predict an assignment of future categories to future security incidents, (iii) an assignment module, stored in memory, that assigns a category to a new security incident by applying the supervised machine learning function to a new feature vector that describes the new security incident to predict the category for the new security incident, (iv) a notification module, stored in memory, that notifies a client, through an electronically transmitted security incident report, of the new security incident and the category assigned to the new security incident based on applying the supervised machine learning function to the feature vector that describes the new security incident to enable the client to perform a security action to protect itself from a corresponding security threat, and (v) at least one physical processor configured to execute the generation module, the training module, the assignment module, and the notification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) generate, within a training dataset, a feature vector for each of a group of security incidents, the feature vector including features that describe the security incidents and the features including categories that were previously assigned to the security incidents as labels to describe the security incidents, (ii) train a supervised machine learning function on the training dataset using the categories that were previously assigned to the security incidents such that the supervised machine learning function learns how to predict an assignment of future categories to future security incidents, (iii) assign a category to a new security incident by applying the supervised machine learning function to a new feature vector that describes the new security incident to predict the category for the new security incident, and (iv) notify a client, through an electronically transmitted security incident report, of the new security incident and the category assigned to the new security incident based on applying the supervised machine learning function to the feature vector that describes the new security incident to enable the client to perform a security action to protect itself from a corresponding security threat.

In one example, a computer-implemented method for categorizing security incidents may include (i) detecting, by an endpoint computing security program, a threat signature alert triggered at a client machine associated with a client, (ii) identifying historical data that records how the client responded to previous reports of security incidents that were categorized to describe the security incidents, (iii) assigning a category for a new security incident that corresponds to the detected threat signature alert based on an analysis of the historical data indicating that the client responded more frequently to the category than the client responded to a different category, and (iv) notifying the client, through an electronically transmitted security incident report, of both the new security incident and the category assigned to the new security incident based on the analysis of the historical data to enable the client to perform a security action to protect itself from a corresponding security threat.

In one example, assigning the category for the new security incident that corresponds to the detected threat signature alert may include converting a category assignment from the different category to the category. In a further example, assigning the category may be performed after determining that both the category and the different category are candidate categories for the security incident from among a larger set of categories. Additionally, in one example, the method may further include (i) assigning the different category to the security incident in addition to assigning the category and (ii) increasing a priority of the category over a priority of the different category in reporting the security incident.

In one embodiment, a system for implementing the above-described method may include (i) a detection module, stored in memory, that detects, through an endpoint computing security program, a threat signature alert triggered at a client machine associated with a client, (ii) an identification module, stored in memory, that identifies historical data that records how the client responded to previous reports of security incidents that were categorized to describe the security incidents, (iii) an assignment module, stored in memory, that assigns a category for a new security incident that corresponds to the detected threat signature alert based on an analysis of the historical data indicating that the client responded more frequently to the category than the client responded to a different category, and (iv) a notification module, stored in memory, that notifies the client, through an electronically transmitted security incident report, of both the new security incident and the category assigned to the new security incident based on the analysis of the historical data to enable the client to perform a security action to protect itself from a corresponding security threat.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, through an endpoint computing security program, a threat signature alert triggered at a client machine associated with a client, (ii) identify historical data that records how the client responded to previous reports of security incidents that were categorized to describe the security incidents, (iii) assign a category for a new security incident that corresponds to the detected threat signature alert based on an analysis of the historical data indicating that the client responded more frequently to the category than the client responded to a different category, and (iv) notify the client, through an electronically transmitted security incident report, of both the new security incident and the category assigned to the new security incident based on the analysis of the historical data to enable the client to perform a security action to protect itself from a corresponding security threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a block diagram of example training data.

Figure 1:
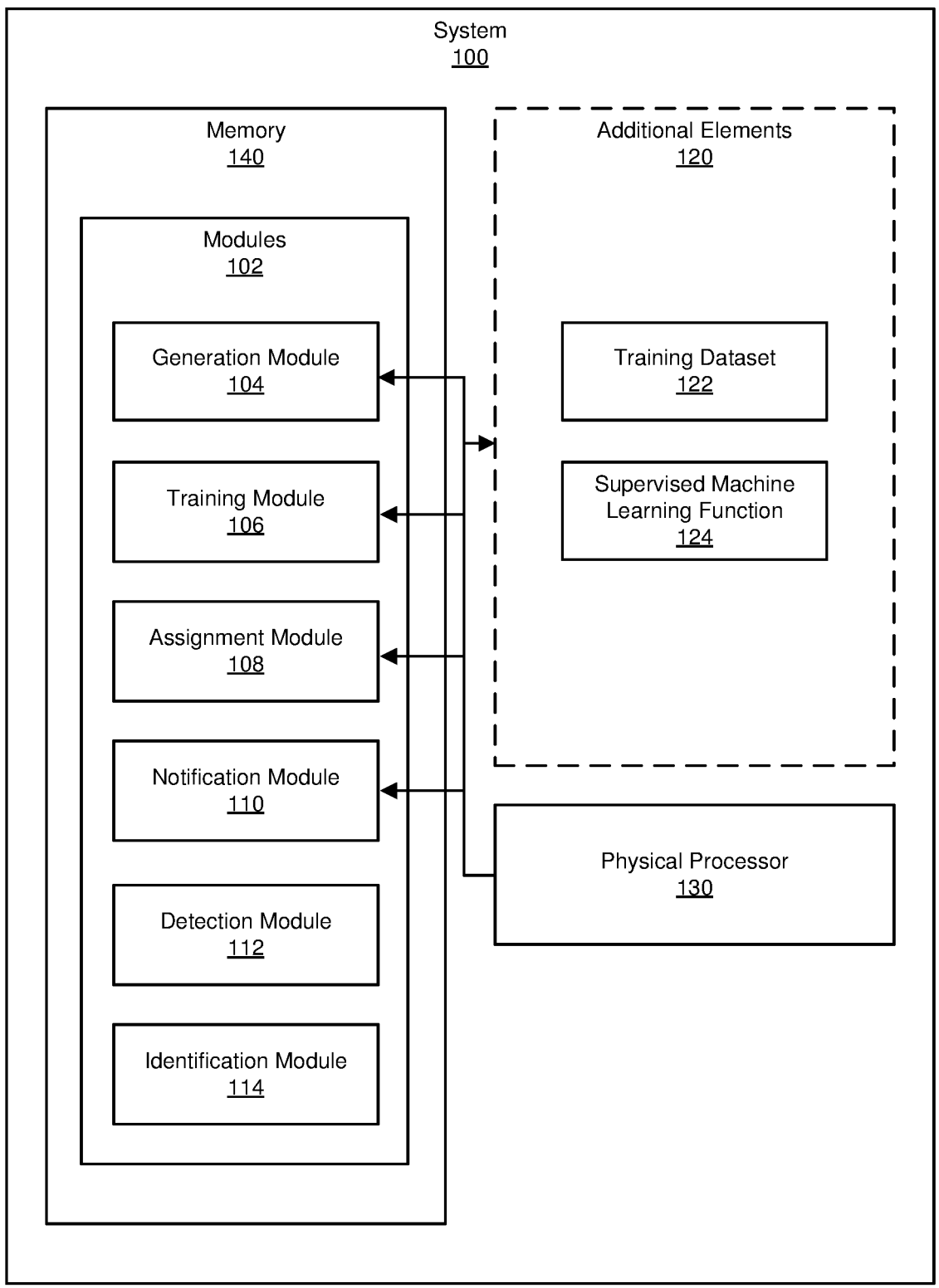
FIG. 1 is a block diagram of an example system for categorizing security incidents.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for categorizing security incidents. In the computing resource security field, security vendors may detect signature threat alerts at client machines that the security vendors protect. Security vendors may then generate a data structure, within a backend security server, to describe a security incident that corresponds to the detected signature threat alert. In some examples, the security incident may correspond to a single detected signature threat alert, and in other examples, the security incident may correspond to a multitude of signature threat alerts detected over a period of time. The data structure that describes the security incident may specify information collected through the detection of the signature threat alert. For example, the data structure may specify an identifier of the signature threat alert, a timing of the detection of the signature threat alert, and optionally a category of the signature threat alert (e.g., malware executable, denial of service attack, web server attack, etc.). Additionally, the security vendor at the backend security server may further analyze the collected information and thereby generate new information to annotate and/or supplement the previously collected information. For example, the backend security server may assign a category to the security incident. The category assigned to the security incident may provide additional information, because the signature threat alert that corresponds to the security incident may be uncategorized and/or because the security incident corresponds to a multitude of signature threat alerts with competing or varying categories. The backend server may additionally specify other information for the security incident, such as a severity code.

In view of the above, the disclosed systems and methods may solve or address some problems that arise in the context of these computing resource security systems. For example, in some cases clients or customers may receive reports that indicate a large volume of security incidents. The clients may therefore ignore many of these security incidents (e.g., ignore as much as 90% or more of the security incidents). Accordingly, it would be desirable to improve the systems and methods to increase the effectiveness, manageability, and/or client response rate associated with the security incident reports. In some examples, the disclosed systems and methods may increase the response rate by adjusting at least one categorization of the security incident based on historical data indicating that the client has historically had a higher response rate to that categorization than to another alternative categorization.

Additionally, or alternatively, assigning a category to the security incident may be performed manually, or by hand, by a security analyst of the security vendor at the backend security server. As the volume of clients, customers, and/or security incidents increases, manual methods may become burdensome and prone to human error. Accordingly, the disclosed systems and methods may make improvements by automating the categorization through machine learning, as discussed further below.

Additionally, the use of machine learning may enable the security vendor, and the associated backend security server, to meaningfully categorize security incidents even when some or all of the signature threat alerts that triggered the security incidents are not themselves categorized. For example, one or more smoke detector signature threat alerts, as discussed further below, may trigger simply to indicate that suspicious behavior is observed at a client machine. In one specific example, the client machine may indicate sluggish performance and/or excessive hard drive operations or network communications. A human analyst of the security vendor may find it impractical or impossible to categorize the security incident himself or herself (e.g., where the category indicates the nature, type, origin, and/or causal mechanism that explains the security incident or corresponds to the security incident). Nevertheless, through machine learning analysis performed on the backend security server, clusters of security incidents with the same smoke detector signature threat alerts, which were previously uncategorized, may thereby enable the disclosed systems and methods to predict a proper, correct, and/or appropriate categorization for the security incident. In other words, through machine learning, the disclosed systems and methods may infer that a new security incident should have a specific categorization, even if all of the signature threat alerts that triggered the security incident are not themselves categorized but simply indicate suspicious activity at a client machine without a known cause, based on an analysis of previous security incidents that indicated the same or similar suspicious activity and were later categorized properly.

Figure 2:
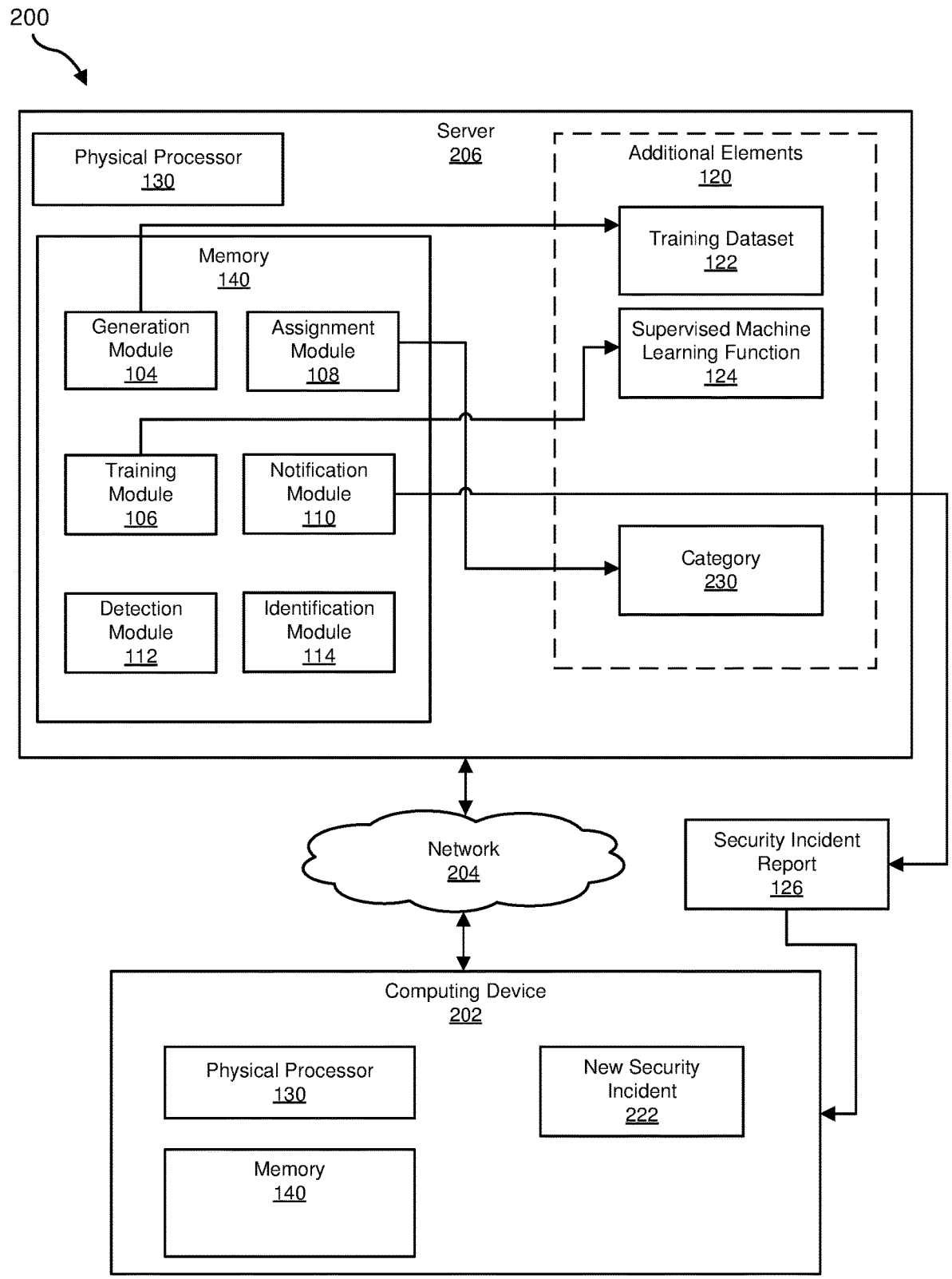
FIG. 2 is a block diagram of an additional example system for categorizing security incidents.

The following will provide, with reference to FIGS. 1-2, detailed descriptions of example systems for categorizing security incidents. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for categorizing security incidents. As illustrated in this figure, example system 100 may include one or more modules 102 for performing one or more tasks. For example, and as will be explained in greater detail below, example system 100 may include a generation module 104 that generates, within a training dataset, a feature vector for each of a group of security incidents. The feature vector may include features that describe the security incidents and the features may include categories that were previously assigned to the security incidents as labels to describe the security incidents. Exemplary system 100 may additionally include a training module 106 that trains a supervised machine learning function on the training dataset using the categories that were previously assigned to the security incidents such that the supervised machine learning function learns how to predict an assignment of future categories to future security incidents. Exemplary system 100 may also include an assignment module 108 that assigns a category to a new security incident by applying the supervised machine learning function to a new feature vector that describes the new security incident to predict the category for the new security incident. Exemplary system 100 may additionally include a notification module 110 that notifies a client, through an electronically transmitted security incident report, of the new security incident and the category assigned to the new security incident based on applying the supervised machine learning function to the feature vector that describes the new security incident to enable the client to perform a security action to protect itself from a corresponding security threat. Although illustrated as separate elements, one or more of modules 102 in FIG. 1 may represent portions of a single module or application.

Additionally, or alternatively, system 100 may also include a detection module 112 and an identification module 114. In this embodiment, detection module 112 may detect, through an endpoint computing security program, a threat signature alert triggered at a client machine associated with a client. Identification module 114 may identify historical data that records how the client responded to previous reports of security incidents that were categorized to describe the security incidents. Assignment module 108 may assign a category for a new security incident that corresponds to the detected threat signature alert based on an analysis of the historical data indicating that the client responded more frequently to the category than the client responded to a different category. Additionally, notification module 110 may notify the client, through an electronically transmitted security incident report, of both the new security incident and the category assigned to the new security incident based on the analysis of the historical data to enable the client to perform a security action to protect itself from a corresponding security threat.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate categorizing security incidents. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a training dataset 122, and a supervised machine learning function 124. Training dataset 122 may include feature vectors for a group of security incidents, as discussed above, and may provide the data on which supervised machine learning function 124 is trained, as discussed further below. Training dataset 122 may also include historical data indicating historical response rates by a client corresponding to previous security incident reports, thereby indicating how frequently the client responded to different categories of security incidents. Additional elements 120 introduced in FIG. 1 generally represent data structures that may be stored within computing memory and/or a relational database or other database.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to categorize security incidents. For example, and as will be described in greater detail below, generation module 104 may generate, within training dataset 122, a feature vector for each of a group of security incidents. The feature vector may include features that describe the security incidents and the features may include categories that were previously assigned to the security incidents as labels to describe the security incidents (as shown further in FIG. 4 below). Training module 106 may train supervised machine learning function 124 on training dataset 122 using the categories that were previously assigned to the security incidents such that supervised machine learning function 124 learns how to predict an assignment of future categories to future security incidents. Assignment module 108 may assign a category 230 to a new security incident 222 by applying supervised machine learning function 124 to a new feature vector that describes new security incident 222 to predict category 230 for new security incident 222. Notification module 110 may notify a client, which may correspond to computing device 202, through an electronically transmitted security incident report 232, of new security incident 222 and category 230 assigned to new security incident 222 based on applying supervised machine learning function 124 to the feature vector that describes new security incident 222 to enable the client to perform a security action to protect itself from a corresponding security threat.

Computing device 202 generally represents any type or form of computing device capable of reading computer-executable instructions. In general, computing device 202 may correspond to a client machine of a client or customer protected by a security vendor, as discussed above. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of facilitating the categorization of security incidents in accordance with method 300 and/or method 500 below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
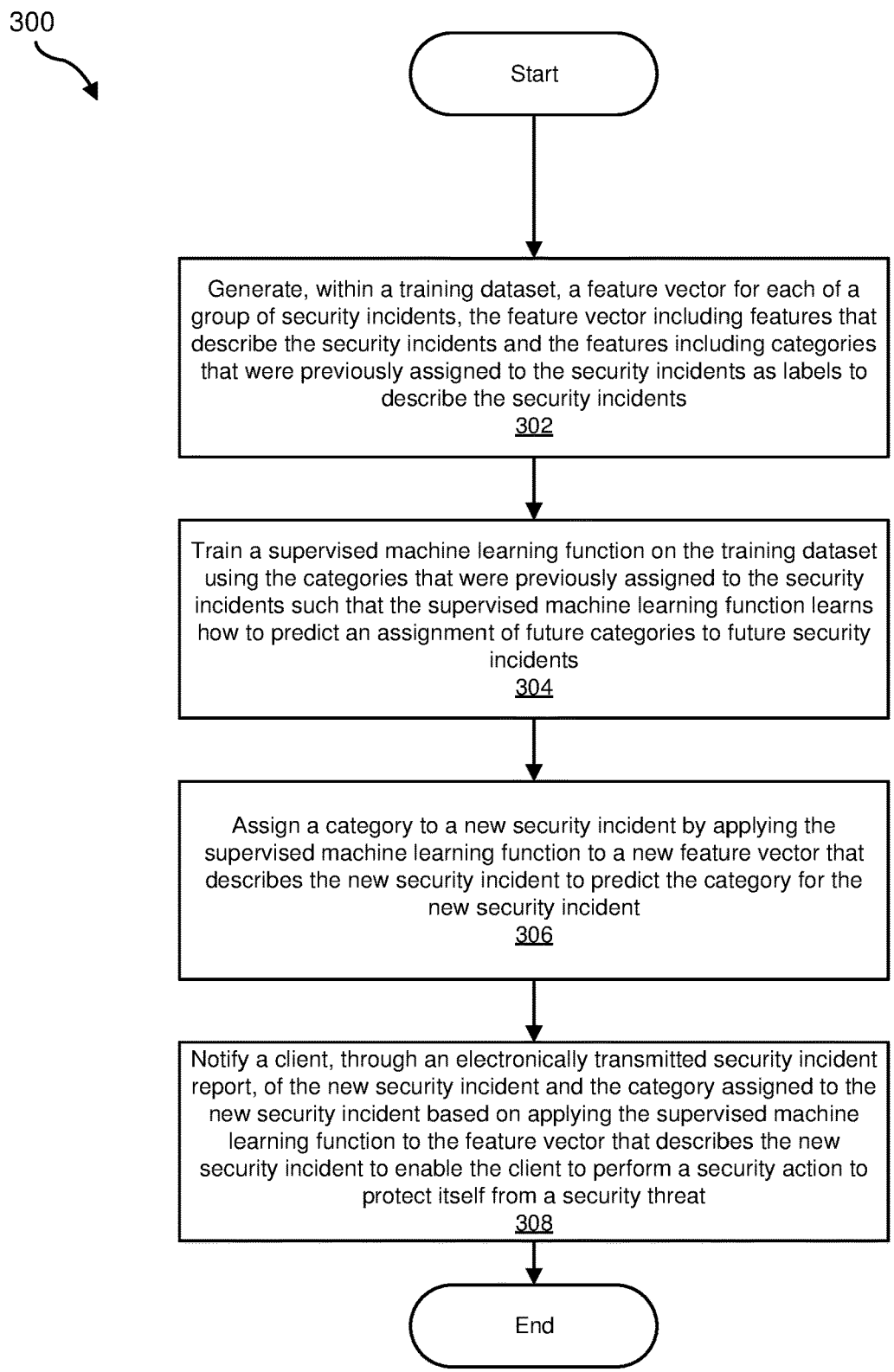
FIG. 3 is a flow diagram of an example method for categorizing security incidents.

FIG. 3 is a flow diagram of an example computer-implemented method 300 for categorizing security incidents. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may generate, within a training dataset, a feature vector for each of a group of security incidents. The feature vector may include features that describe the security incidents and the features may include categories that were previously assigned to the security incidents as labels to describe the security incidents. For example, generation module 104 may, as part of server 206 in FIG. 2, generate, within training dataset 122, a feature vector for each of a group of security incidents.

As used herein, the term "feature vector" generally refers to any vector, stored within computing memory, of at least two fields for describing a corresponding object, such as a security incident. These fields may correspond to features or attributes of the security incident (e.g., a category of the security incident, a time of the security incident, a severity code for the security incident, a response code for the security incident, etc.), and the fields may be populated with values that specify the specific features or attributes for the security incident (e.g., a category of a "malware executable," a time of "12:31," a severity code of "severe," and a response code of "resolved," as specific examples). As used herein, the phrase "as labels" generally refers to the use of the categories (or other feature within the feature vector) as labels according to supervised machine learning and the performance of method 300 and/or method 500, as discussed further below.

Additionally, as used herein, the term "category" generally refers to a field of the feature vector that specifies a value that describes the type, nature, causal mechanism, and/or general field of the security threat. In other words, the term category generally refers to a field of the feature vector that specifies a value that provides more information about the security incident to enable a client or customer to understand the type or nature of the security incident and respond appropriately. Moreover, as used herein, and unless specified otherwise, the term "group of security incidents" generally refers to at least one security incident. In other more specific examples, the term "groups of security incidents" may refer to two or more security incidents.

Examples of categories of security incidents may include malware executable, denial of service attack, web server attack, vulnerability scan, and/or password compromise attack, etc. Additionally, system 100 may organize the categories of security incidents within a multi-level hierarchical taxonomy, which may include at least three layers of categories, subcategories, and/or sub-sub-categories (or "types"). In some examples, the categories, subcategories, and/or sub-sub-categories may be organized in a chain within the multi-level hierarchical taxonomy such that a specific sub-sub-category inherently indicates the parent subcategory and grandparent category (in contrast, the category may correspond to a multitude of varying subcategories, and a subcategory may similarly correspond to a multitude of varying sub-sub-categories). Nevertheless, unless otherwise specified, as used herein the term "category" by itself may broadly refer to any one of the categories, subcategories, and/or sub-sub-categories.

Generation module 104 may generate the training dataset in a variety of ways. In one embodiment, the features of the feature vector further include an additional category that was previously assigned as an additional label to a threat signature alert that triggered in correspondence to a respective security incident. FIG. 4 illustrates an example of training dataset 122, which further provides context regarding this embodiment. As shown in FIG. 4, training dataset 122 may include feature vectors for a security incident 402, a security incident 404, a security incident 406, a security incident 408, and a security incident 410. As further shown in this figure, each of the feature vectors includes fields that specify values for the specific security incident. For example, the feature vector for security incident 402 specifies a value of "HIGH SEVERITY" for the field corresponding to the severity code. Additionally, the feature vector for security incident 402 specifies the value of "DOS Attack" for the field (i.e., feature) corresponding to the category of the security incident.

Additionally, the feature vector for security incident 402 also includes four other fields, which correspond to the identifiers for two signature threat alerts, signature A and signature B, as well as the categories that were previously assigned to these signature threat alerts. More specifically, FIG. 4 shows that signature A was previously assigned a category of "DOS Attack" and signature B was previously assigned a category of "vulnerability scan." Notably, although the feature vector for security incident 402 shown within FIG. 4 includes both the identifier for the signature threat alerts as well as the categories that were previously assigned to the signature threat alerts, the inclusion of the identifiers for the signature threat alerts is optional and, in other examples, the feature vector may simply include the categories for the signature threat alerts without further including the identifiers.

In some examples, generation module 104 may identify the additional category that was previously assigned as the additional label to the threat signature alert in a specific way. In particular, generation module 104 may first identify a historical security incident to which the threat signature alert triggered in correspondence to the historical security incident without triggering any other categorized threat signature alert. Generation module 104 may then leverage a category that was previously assigned to the historical security incident as the additional category. For example, prior to generation module 104 populating the field for the category of signature A within security incident 402, generation module 104 may search for, or otherwise identify, a historical security incident that includes, within its feature vector, a field for a signature threat alert for signature A, without including, within the feature vector, any other field for another signature threat alert. Generation module 104 may then identify the category that was previously assigned to the feature vector for this historical security incident and then leverage that category as the category for signature A (i.e., "DOS Attack" in the example of FIG. 4).

Additionally, or alternatively, generation module 104 may identify the additional category that was previously assigned as the additional label to the threat signature alert by extracting the additional category from a multi-level hierarchical category taxonomy that assigns to the threat signature alert both the additional category and a sub-category under the additional category. In other words, generation module 104 may simply reference the multi-level hierarchical category taxonomy, which is further discussed above, to ascertain the mapping between a signature threat alert and a corresponding category, sub-category, and/or sub-sub-category. In this example, generation module 104 may bypass the search for a historical security incident that only includes the signature threat alert in question to leverage the category assigned to the historical security incident, as further described for the embodiment outlined above.

In one embodiment, the features of the feature vector further include an identifier for a smoke detector threat signature alert that was not assigned a category based on the smoke detector threat signature alert indicating suspicious behavior on a client machine without indicating a cause of the suspicious behavior. As used herein, the term "smoke detector threat signature alert" generally refers to a threat signature alert that is configured to detect suspicious behavior on a client machine without further detecting a category, type, nature, causal mechanism, and/or reason why the suspicious behavior is occurring. By analogy, a smoke detector may detect that smoke is present in a room without further detecting whether a fire is causing the smoke, or whether the presence of the smoke is benign. Examples of suspicious behavior may include sluggish performance (e.g., performance of a central processing unit, disk drive, random access memory, a peripheral device, and/or network device, etc.), an exceptional rate or amount of disk drive operations, an exceptional rate or amount of network activity, an exceptional rate or number of attempts to access a specific computing resource, etc. In these examples, an exceptional rate or amount may be identified in terms of a predefined threshold.

Returning to the example of FIG. 4, security incident 406 and security incident 408 may correspond to security incidents that were triggered by smoke detector signature threat alerts, specifically signature D, signature E, signature F, and signature G. These smoke detector signature threat alerts may correspond to signatures that detect any of the suspicious behavior outlined above (e.g., sluggish performance, exceptional rate or amount of disk drive operations, etc.). Accordingly, the example of this figure shows that the detection of signature D and signature E on one client machine triggered security incident 406, which resulted in further analysis or operations that categorized signature incident 406 as a vulnerability scan with a corresponding severity code of "HIGH." Similarly, this figure shows that the detection of signature F and signature G on one client machine triggered security incident 408, which resulted in further analysis or operations that categorized signature incident 408 as "advertising tracking" with a severity code of "LOW."

At step 304, one or more of the systems described herein may train a supervised machine learning function on the training dataset using the categories that were previously assigned to the security incidents such that the supervised machine learning function learns how to predict an assignment of future categories to future security incidents. For example, training module 106 may, as part of server 206 in FIG. 2, train supervised machine learning function 124 on training dataset 122 using the categories that were previously assigned to the security incidents such that supervised machine learning function 124 learns how to predict an assignment of future categories to future security incidents.

Training module 106 may train a supervised machine learning function in a variety of ways. As used herein, the phrase "train a supervised machine learning function" generally refers to training procedures, according to machine learning, which is a term of art in the field of computing security and/or data mining or algorithms, to thereby adjust or tune the configuration of a function or algorithm such that the function or algorithm becomes configured to accept feature vectors as inputs and produce predictions of one or more labels as outputs. In the example of FIG. 4, the supervised machine learning function may accept a new feature vector for a new security incident, such as security incident 410, which has not yet been categorized (as indicated by the question mark in the category field within the feature vector), and, in response, the supervised machine learning function may produce a prediction of one or more categories for security incident 410 as one or more outputs, as discussed further below. In some examples, training the supervised machine learning function may refer to adjusting or modifying one or more numerical weights within the supervised machine learning function in a manner that increases the ability of the supervised machine learning function to predict the corresponding label or labels.

Notably, the term "supervised machine learning function" generally refers to machine learning based on a labeled training dataset, such as training dataset 122, rather than an unlabeled dataset (in this example, the categories of the previously categorized security incidents within training dataset 122, such as the category of "DOS Attack" for security incident 402, may effectively function as labels for the purposes of supervised machine learning). Additionally, because the supervised machine learning function may optionally generate a multitude of labels for a new security incident, such as security incident 410, the machine learning may correspond to the specific type of machine learning known as multi-label classification and/or multi-output classification, which are terms of art in the computing security and/or data mining fields.

Notably, in some examples, training module 106 may train the supervised machine learning function on the training dataset by establishing a data grid such that security incidents correspond to at least one of rows and columns of the data grid. In the example of FIG. 4, the security incidents correspond to rows within the data grid shown within training dataset 122. Additionally, the term "data grid" generally refers to a data structure, within computing memory, that establishes or defines a two-dimensional matrix, parallel to the data grid shown within FIG. 4, even if the two-dimensional matrix is never visually depicted in the form of rows and columns.

Additionally, generation module 104 and/or training module 106 may modify or adjust the training dataset, prior to training the supervised machine learning function, in one or more of the following ways. For example, one or more of these modules may eliminate or omit, within the training dataset, some or all security incidents that correspond to threat signature alerts that were previously categorized, such as security incident 402 and security incident 404, which correspond to signature A, signature B, and signature C, which were all previously categorized, as further discussed above. Additionally, or alternatively, one or more of these modules may eliminate or omit, within the same or different training dataset, security incidents that correspond to smoke detector threat signature alerts that were not previously categorized, such as security incident 406 and security incident 408.

In other words, in some examples, one or more of these modules may effectively divide the training dataset into two separate datasets, one that includes security incidents for "active" and previously categorized signature threat alerts, such as security incident 402 and security incident 404, and another separate dataset, which includes security incidents for smoke detector signature threat alerts, such as security incident 406 and security incident 408. In these examples, one or more of modules 102 may train separate supervised machine learning functions on the two separate datasets, thereby resulting in two different supervised machine learning functions. When categorizing a new security incident, system 100 may thereby apply one or both of these two different supervised machine learning functions, simultaneously, or in sequence, to derive two separate outputs or predicted labels, and/or combine these outputs according to any suitable combination algorithm and/or weighted formula (which may weight the two outputs of the two separate supervised machine learning functions equally or differently). Additionally, in these examples, one or both of generation module 104 and training module 106 may include mixed security incidents, which may include both an active signature threat alert and a smoke detector signature threat alert, within either the pure active signature threat alert dataset, the pure smoke detector signature threat alert dataset, and/or a third separate dataset for mixed security incidents.

At step 306, one or more of the systems described herein may assign a category to a new security incident by applying the supervised machine learning function to a new feature vector that describes the new security incident to predict the category for the new security incident. For example, assignment module 108 may, as part of server 206 in FIG. 2, assign category 230 to new security incident 222 by applying supervised machine learning function 124 to a new feature vector that describes new security incident 222 to predict category 230 for new security incident 222. As used herein, the term "new security incident" refers to a security incident that has not been previously categorized, or that is in the process of being categorized again, as further discussed above.

Assignment module 108 may assign the category to the new security incident in a variety of ways. In some examples, assignment module 108 may assign a multitude of categories (i.e., at least two) to the new security incident, in accordance with multi-label classification, as discussed above. In further examples, assignment module 108 may assign the multitude of categories to the new security incident by prioritizing the category over a different category. As used herein, the phrase "prioritize the category" generally refers to assigning the category a symbolic or numerical priority level (e.g., a category assigned a numerical priority level of "1" may take precedence over a category assigned a numerical priority level of "2"). In some examples, the symbolic or numerical priority level maybe displayed within the report of security incidents along with the identifiers of the security incidents themselves. Additionally, or alternatively, the phrase "prioritize the category" may refer to adjusting one or more of a font, display, text, screen space, and/or presentation order in a manner that renders the category more conspicuous and/or salient to the client, for example within an electronically transmitted report of security incidents (e.g., a brighter, bigger font, a larger size of text, a greater share of screen space, and/or closer to a top of a list of security incidents). In some examples, prioritizing the category may simply refer to placing the security incident with that category on a list of higher priority security incidents, while still maintaining another list of lower priority security incidents.

In further examples, assignment module 108 may assign the category to the new security incident based at least in part on an analysis of historical data indicating that the client responded more frequently to the category than the client responded to the different category, from among a multitude of categories. For example, if assignment module 108 determines that both "DOS Attack" and "Server Attack" fit or match a detected fact pattern for security incident 402, but assignment module 108 also determines that the client has historically responded to security incidents that were categorized as "DOS Attack" more frequently than the client responded to security incidents that were categorized as "Server Attack," then assignment module 108 may assign the category of "DOS Attack" to security incident 402 based at least in part on that factor or determination. Assignment module 108 may thereby increase the odds of the client actually responding to security incident 402 and thereby resolving or addressing the corresponding security threat. Additionally, when assigning the category to the security incident, assignment module 108 may weight one or both of the following factors in proportion to a strength or measurement of the respective factor: (i) a degree to which the detected fact pattern or signature threat alert(s) fit or match the corresponding factor and/or (ii) a degree to which the response rate or frequency for the assigned category is greater than the response rate or frequency for the different category.

At step 308, one or more of the systems described herein may notify a client, through an electronically transmitted security incident report, of the new security incident and the category assigned to the new security incident based on applying the supervised machine learning function to the feature vector that describes the new security incident to enable the client to perform a security action to protect itself from a corresponding security threat. For example, notification module 110 may, as part of server 206 in FIG. 2, notify a client, through an electronically transmitted security incident report 232, of new security incident 222 and category 230 assigned to new security incident 222 based on applying supervised machine learning function 124 to the feature vector that describes new security incident 222 to enable the client to perform a security action to protect itself from a corresponding security threat.

Notification module 110 may notify the client of the new security incident and the category assigned to the new security incident in a variety of ways. As used herein, the term "client" generally refers to a user, administrator, customer of a security vendor, and/or computing machine or device that is operated by the user and/or protected by the security vendor (e.g., through an endpoint security product in communication with a backend security server, such as server 206). As used herein, the term "electronically transmitted security incident report" generally refers to a list of security incidents, such as the security incidents shown in FIG. 4, such that the list of security incidents is communicated to the client. In some examples, the list of security incidents may be communicated to the client by displaying all or part of the list simultaneously, or in a series over time, or otherwise outputting or transmitting the text or content of the list of security incidents in a manner that informs the client about the corresponding security incidents, as well as any other relevant information attached with the report. In general, the report may be transmitted through a text message, instant message, SHORT MESSAGE SERVICE message, email, bulletin board, web interface, message board, client-side security application, pop-up message, automated voice message, and/or any other suitable means of electronic transmission.

Notably, in addition to the steps of method 300 shown in FIG. 3, method 300 may further include the step of performing a security action to protect the client from a corresponding security threat (e.g., a security threat the corresponds to the new security incident or to a future security incident). The security action may be performed manually, automatically, semi-automatically, and/or autonomously by a module such as notification module 110. As used herein, the term "security action" generally refers to any action that a client or computing device may perform to further protect a computing resource from a corresponding security threat, as discussed further below. The security action may correspond to enabling or heightening one or more security settings, applying a patch, script, and/or macro that is designed to resolve or neutralize a corresponding security threat, disabling, powering down, throttling, quarantining, sandboxing, and/or disconnecting one or more computing resources, updating a signature threat alert set of definitions, upgrading an endpoint security program, installing and/or uninstalling one or more computing programs (e.g., installing an additional protective security program and/or uninstalling a suspicious and/or malicious program or other computing element), etc. The security action may be performed by the client in response to receiving the security incident report, performed by the client in response to a prompt from notification module 110, performed automatically at computing device 202 in response to a remote command from notification module 110 at server 206, and/or performed automatically at server 206 in response to detecting the security incident.

Figure 5:
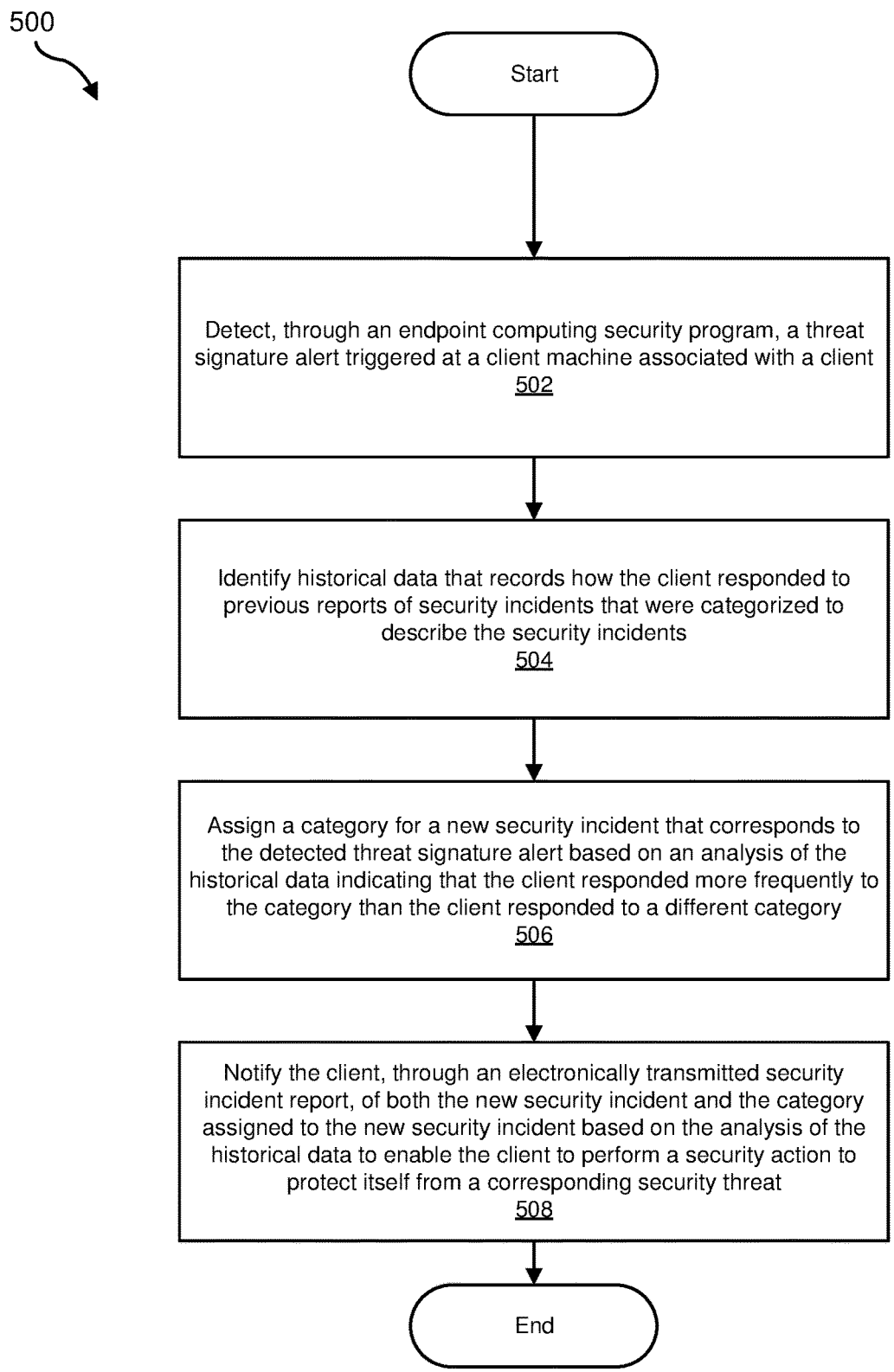
FIG. 5 is a flow diagram of another example method for categorizing security incidents.

FIG. 5 is a flow diagram of an example computer-implemented method 500 for categorizing security incidents. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

For example, at step 502, detection module 112, or another one of modules 102, may detect, through an endpoint computing security program at computing device 202, a threat signature alert triggered by a client machine associated with the client. The threat signature alert may correspond to one of the examples of threat signature alerts shown in FIG. 4, such as signature A or signature B. Notably, as used herein, the term "threat signature alert" generally refers to a signature or pattern that a security program or product monitors for detection, thereby triggering a corresponding alert to notify a security program and/or client about the presence of the signature pattern, which may indicate suspicious activity and/or a known specific security threat, as further discussed above.

Returning to FIG. 5, at step 504, identification module 114, or another one of modules 102, may identify historical data that records how the client responded to previous reports of security incidents that were categorized to describe the security incidents. In some examples, identification module 114 may identify a rate, frequency, absolute number, and/or relative number indicating how the client responded to security incidents that were reported as having a specific category (e.g., the client responded to, or addressed, 20% of security incidents that were categorized as "DOS Attack"). In some examples, identification module 114 may analyze the historical data to derive or compute one or more of these values. In other examples, identification module 110 may simply retrieve or read the value which has been previously calculated and stored within computing memory.

Additionally, in some examples, identification module 114, or another one of modules 102, may compute a relative response rate, frequency, number, and/or amount by subtracting and/or dividing the response rate for one category with the response rate for another category (e.g., the client is 20% more likely to respond to security incidents that have been assigned to one category than to respond to security incidents that been assigned to another category). In general, identification module 114 may compare the response rates, or other values, for two respective categories, to calculate, derive, and/or retrieve data on which to base a decision on how to categorize a new security incident in a manner that increases or maximizes the odds that the client will actually respond to the new security incident in an attempt to resolve it.

Returning to FIG. 5, at step 506, assignment module 108, or another one of modules 102, may assign a category for a new security incident the corresponds to the detected threat signature alert based on analysis of the historical data indicating that the client responded more frequently to the category than the client responded to a different category. Assignment module 108 may perform the analysis of the historical data itself and/or identification module 114 may perform the analysis in one or more of the ways described above for step 504 of method 500. In general, assignment module 108 may select, adjust, and/or modify a categorization of the new security incident, based on the analysis of historical data, in a manner that increases the odds of the client actually responding to the new security incident based on a determination that the category assigned to the new security incident is a category to which the client has a relatively higher response rate, as further discussed above and below.

In some examples, assignment module 108 may assign the category for the new security incident that corresponds to the detected threat signature alert at least in part by converting a category assignment from the different category to the category. In other words, assignment module 108 may switch an initial or preliminary category assigned to the new security incident to a new category based on the additional factor that the client has a higher response rate, according to the historical data, to the new category, as further discussed above.

Moreover, in some examples, assignment module 108 may assign the category after determining that both the category and the different category are candidate categories for the security incident from among a larger set of categories. As used herein, the phrase "determining that both the category and the different category are candidate categories for the security incident from among a larger set of categories" generally refers to assignment module 108, and/or another module within modules 102 selecting at least the category and the different category, while failing to select or omitting at least one other category, within a larger set of candidate categories, as preliminary candidate categories based on the category and the different category both satisfying a baseline level of fit or match to one or more of facts or circumstances corresponding to signature threat alerts that triggered the corresponding security incident. In other words, assignment module 108 may first determine that both the category and the different category are suitable candidate categories, because both of these categories satisfy a baseline level of fit or match, and then assignment module 108 may distinguish between the two categories based on the additional factor that the client has a higher response rate to historical security incidents that were categorized with one category in comparison to another category.

In further examples, assignment module 108 may assign the different category to the security incident in addition to assigning the category (e.g., in accordance with multi-label classification, as further discussed at length above). Additionally, assignment module 108 may further increase a priority of the category over a priority of the different category in reporting the security incident (e.g., based on the client having a higher response rate to security incidents that were categorized with the category, in comparison to security incidents that were categorized with the different category). Notably, assignment module 108 may increase the priority of the category in any of the manners for increasing priority discussed at length above.

Returning to FIG. 5, at step 508, notification module 110, or another one of modules 102, may notify the client, through an electronically transmitted security incident report, of both the new security incident and the category assigned to the new security incident based on the analysis of historical data to enable the client to perform a security action to protect itself from a corresponding security threat. In general, application module 110 may notify the client, through the electronically transmitted security incident report, in a manner that parallels the performance of step 308 of method 300, as shown in FIG. 3, and as discussed at length above. Additionally, a security action may be performed, at the end of method 500, that parallels any of the security actions discussed above that may be performed at the end of method 300.

The above discussion provided an overview of methods 300 and 500 in FIGS. 3 and 5, respectively. Additionally, the following discussion provides an overview of specific details of concrete embodiments of the disclosed systems and methods.

Serious security incidents often include multiple alerts, any one of which could have triggered the incident, resulting in a situation in which the incident could belong in multiple areas of an incident taxonomy. This problem is important because customers of a product or service, such as SYMANTEC'S MANAGED SECURITY SERVICE PROVIDERS, tend to respond better to some types of incidents than to others. In many cases, the customers lack security expertise, thereby depending heavily on the description of the incident, which is determined by the element of the taxonomy into which the incident is placed.

Adding to the importance of the problem is the fact that customers respond better to some categories of incidents than to others. Making matters even worse, customers have different priorities. Accordingly, if two customers have the same incident, the best category to specify for one customer may not be the same as that of another. This is certainly the case in SYMANTEC'S MANAGED SECURITY SERVICES, which has a hierarchical taxonomy of incident categories, subcategories, and types. Rules map alerts to incident types, but when multiple rules could have fired, there may be no principled method of selecting the most appropriate category for the incident.

In addition, there are instances in which an element of the taxonomy contains a mixture of severe and non-severe incidents, and the taxonomy element should be split so that low-quality incidents do not reduce the response rate of their more severe peers. For systems that allow an incident to be tagged with multiple elements of a taxonomy, it is important to determine what those elements of the taxonomy should be, and how they should be ranked. The disclosed systems and methods also address the problem of determining how to port an N:1 incident to taxonomy system to an N:M system such that security incidents may receive multiple labels according to multi-label classification.

Related systems may assign incident categories on the basis of "active" signatures that trigger incident generation, each of which is mapped to an incident category. The disclosed systems and methods may reverse engineer this mapping of active signatures to incident types. Since there is typically an N:1 active signature to incident taxonomy mapping (e.g., the active signatures only receive one category), the disclosed systems and methods determine the taxonomy element to which each active signature belongs as the taxonomy element to which it is assigned. The disclosed systems and methods may achieve this goal, of determining the category to which a signature is assigned, by identifying incidents that contain that active signature and no additional active signatures.

The disclosed systems and methods may frame a multi-label machine learning problem, in which case each row or column represents an incident, and each incident is described by the signatures that triggered on the infected machine during the incident timeframe. The labels that the systems and methods predict for each incident include incident taxonomy elements. The disclosed systems and methods tag each row with the actual taxonomy element to which the security incident was assigned, in addition to the taxonomy elements that correspond to each of the active signatures that were present in the incident row, whether or not the incident was actually assigned to this element in the taxonomy (in these examples, the active signatures may compete to assign the incident label when multiple labels are possible).

The disclosed systems and methods may then separate the feature set into active signatures and non-active signatures, and train separate classifiers for each subset of the feature space, and ensemble the two classifiers together. This approach is intended to limit the influence of the active signatures and permit the disclosed systems and methods to generalize to cases when an important active signature is missing.

The resulting classifier, or supervised machine learning function, is therefore able to consume collections of signatures from machines, and determine which incident categories the incident or potential incident is most closely aligned. For incidents that map to multiple categories, the disclosed systems and methods can either tag the incident with all of them, or select the associated incident category that the customer is most likely to respond to.

This approach also allows a system to label new smoke detector incidents, which are detected on the basis of anomalous levels of suspicious events, and for which there is no "active" signature to use as the basis for assigning an incident category. Additionally, for incident taxonomy elements that contain a mixture of both high-response-rate incidents and low-response-rate incidents, the disclosed systems and methods may cluster the incident rows to identify clusters of high-response incidents, which the disclosed systems and methods may separate out into their own taxonomy elements. This ensures that low-response incidents do not desensitize customers to incidents of high severity.

Figure 6:
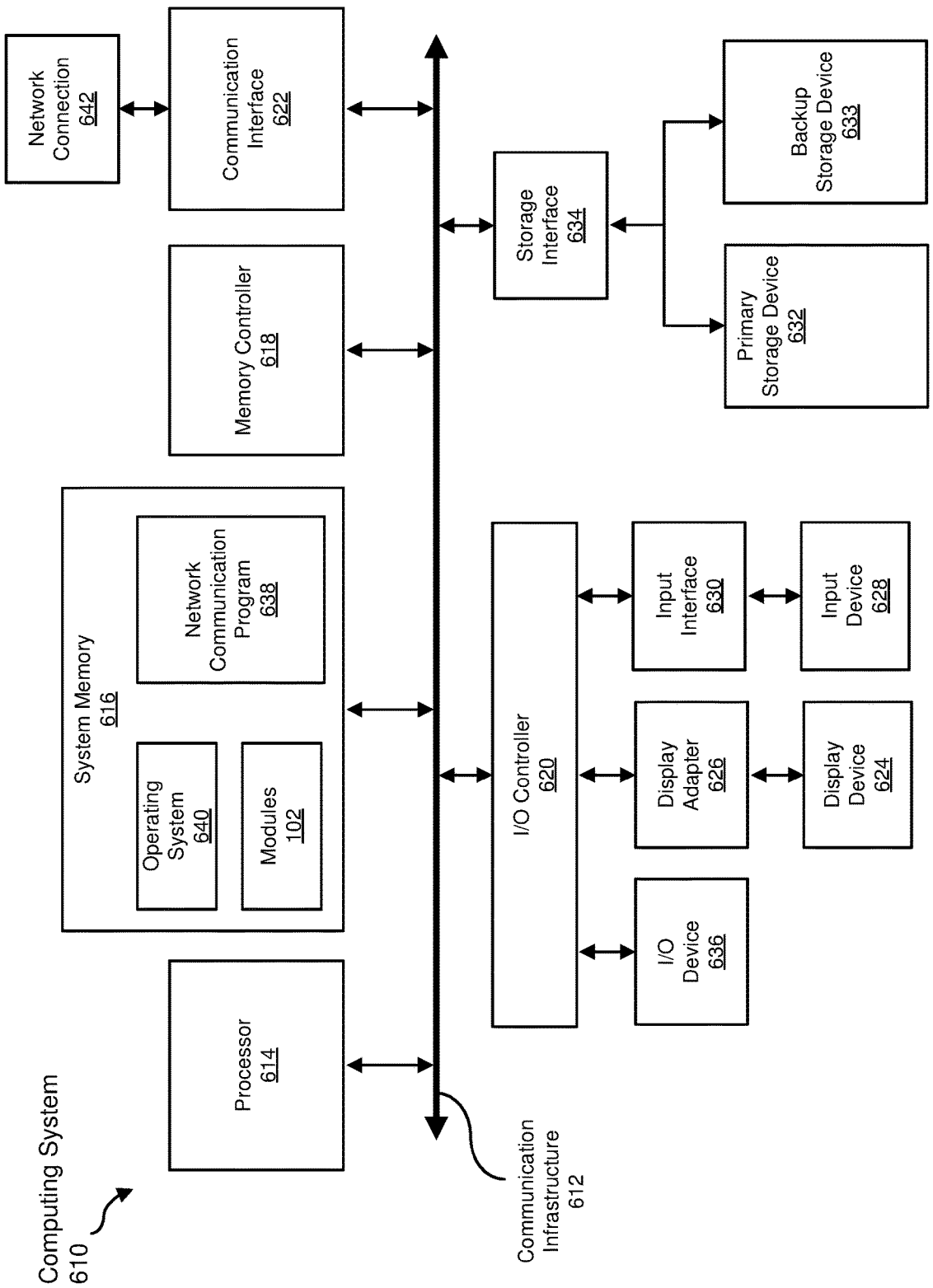
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
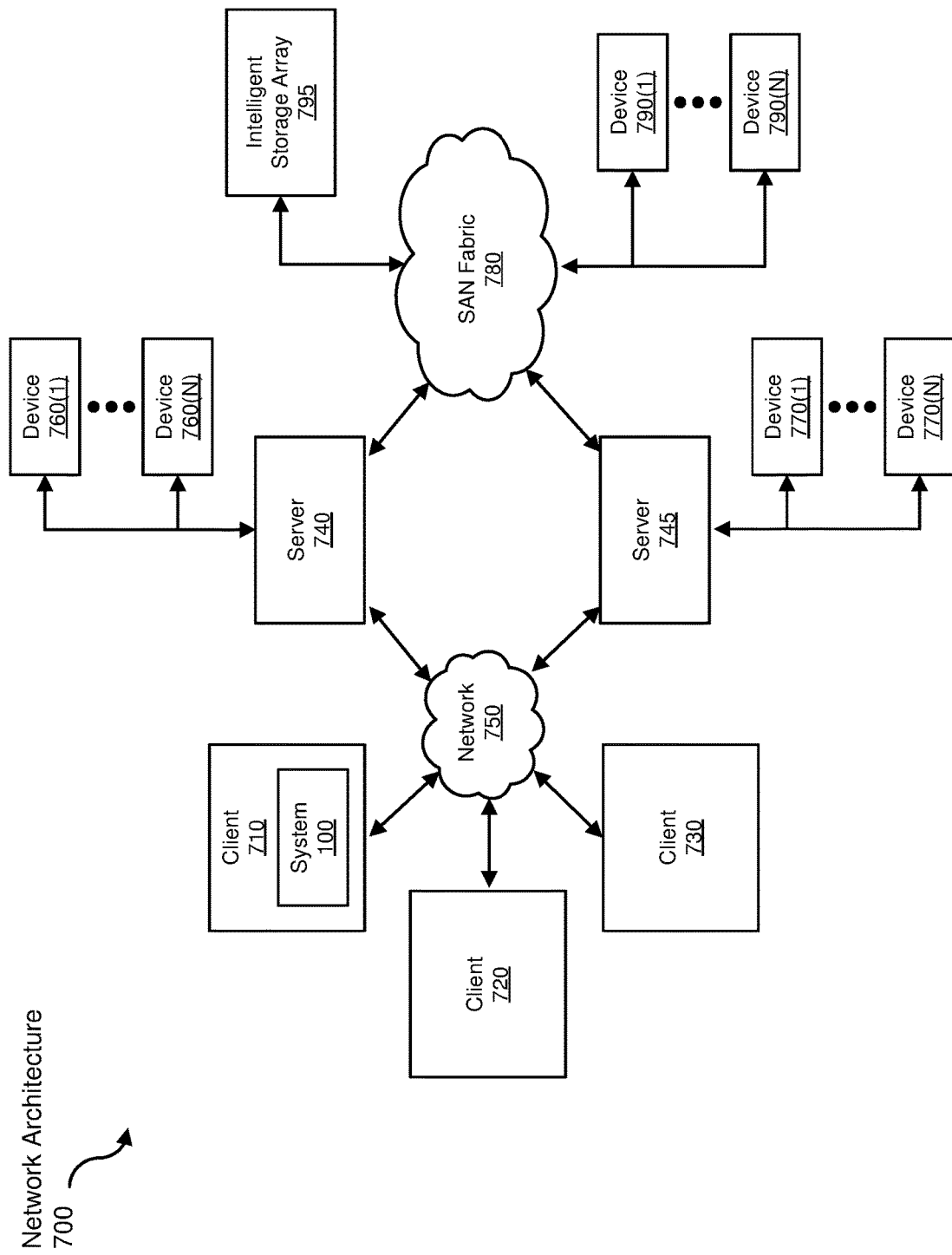
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for categorizing security incidents.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of modules 102 may receive signature threat alert information and transform the information, as discussed above, by using the information to generate security incident reports that enable clients to take further security actions to protect themselves. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing security incidents, at least a portion of the method being performed by a computing device comprising at least one processor, the method comprising:
  generating, within a training dataset, a feature vector for each of a group of security incidents, the feature vector including features that describe the security incidents and the features including categories that were previously assigned to the security incidents as labels to describe the security incidents;
  training a supervised machine learning function on the training dataset using the categories that were previously assigned to the security incidents such that the supervised machine learning function learns how to predict an assignment of future categories to future security incidents;

assigning a category to a new security incident by applying the supervised machine learning function to a new feature vector that describes the new security incident to predict the category for the new security incident; and notifying a client, through an electronically transmitted security incident report, of the new security incident and the category assigned to the new security incident based on applying the supervised machine learning function to the feature vector that describes the new security incident to enable the client to perform a security action to protect itself from a corresponding security threat;

wherein assigning the category to the new security incident is further based at least in part on an analysis of historical data indicating that the client responded more frequently to the category than the client responded to a different category.

2. The computer-implemented method of claim 1, wherein the features of the feature vector further include an additional category that was previously assigned as an additional label to a threat signature alert that triggered in correspondence to a respective security incident.

3. The computer-implemented method of claim 2, wherein the additional category that was previously assigned as the additional label to the threat signature alert is identified by:

identifying a historical security incident to which the threat signature alert triggered in correspondence to the historical security incident without triggering any other categorized threat signature alert; and leveraging a category that was previously assigned to the historical security incident as the additional category.

4. The computer-implemented method of claim 2, wherein the additional category that was previously assigned as the additional label to the threat signature alert is identified by extracting the additional category from a multi-level hierarchical category taxonomy that assigns to the threat signature alert both the additional category and a sub-category under the additional category.

5. The computer-implemented method of claim 1, wherein the features of the feature vector further include an identifier for a smoke detector threat signature alert that was not assigned a category.

6. The computer-implemented method of claim 1, wherein applying the supervised machine learning function to the new feature vector that describes the new security incident results in assigning a plurality of categories to the new security incident.

7. The computer-implemented method of claim 6, wherein assigning the plurality of categories to the new security incident comprises prioritizing the category over the different category.

8. The computer-implemented method of claim 5, wherein the identifier for the smoke detector threat signature alert was not assigned a category based on the smoke detector threat signature alert indicating suspicious behavior on a client machine without indicating a cause of the suspicious behavior.

9. The computer-implemented method of claim 1, wherein training the supervised machine learning function on the training dataset comprises establishing a data grid such that security incidents correspond to at least one of rows and columns of the data grid.

10. The computer-implemented method of claim 1, wherein generating, within the training dataset, the feature vector for each of the group of security incidents comprises one of:

eliminating security incidents that correspond to threat signature alerts that were previously categorized; and eliminating security incidents that correspond to smoke detector threat signature alerts that were not previously categorized.

11. A non-transitory computer-readable medium comprising one or more computer-readable instructions that, when executed by at least one processor of a computing device, cause the computing device to:

generate, within a training dataset, a feature vector for each of a group of security incidents, the feature vector including features that describe the security incidents and the features including categories that were previously assigned to the security incidents as labels to describe the security incidents;

train a supervised machine learning function on the training dataset using the categories that were previously assigned to the security incidents such that the supervised machine learning function learns how to predict an assignment of future categories to future security incidents;

assign a category to a new security incident by applying the supervised machine learning function to a new feature vector that describes the new security incident to predict the category for the new security incident; and notify a client, through an electronically transmitted security incident report, of the new security incident and the category assigned to the new security incident based on applying the supervised machine learning function to the feature vector that describes the new security incident to enable the client to perform a security action to protect itself from a corresponding security threat;

wherein assigning the category to the new security incident is further based at least in part on an analysis of historical data indicating that the client responded more frequently to the category than the client responded to a different category.

12. The non-transitory computer-readable medium of claim 11, wherein the features of the feature vector further include an additional category that was previously assigned as an additional label to a threat signature alert that triggered in correspondence to a respective security incident.

13. The non-transitory computer-readable medium of claim 12, wherein the additional category that was previously assigned as the additional label to the threat signature alert is identified by:

identifying a historical security incident to which the threat signature alert triggered in correspondence to the historical security incident without triggering any other categorized threat signature alert; and leveraging a category that was previously assigned to the historical security incident as the additional category.

14. The non-transitory computer-readable medium of claim 12, wherein the additional category that was previously assigned as the additional label to the threat signature alert is identified by extracting the additional category from a multi-level hierarchical category taxonomy that assigns to the threat signature alert both the additional category and a sub-category under the additional category.

15. The non-transitory computer-readable medium of claim 11, wherein the features of the feature vector further include an identifier for a smoke detector threat signature alert that was not assigned a category based on the smoke detector threat signature alert indicating suspicious behavior on a client machine without indicating a cause of the suspicious behavior.

16. The non-transitory computer-readable medium of claim 11, wherein applying the supervised machine learning function to the new feature vector that describes the new security incident results in assigning a plurality of categories to the new security incident.

17. A system for categorizing security incidents, the system comprising:
- a generation module, stored in a memory, that generates, within a training dataset, a feature vector for each of a group of security incidents, the feature vector including features that describe the security incidents and the features including categories that were previously assigned to the security incidents as labels to describe the security incidents;
- a training module, stored in the memory, that trains a supervised machine learning function on the training dataset using the categories that were previously assigned to the security incidents such that the supervised machine learning function learns how to predict an assignment of future categories to future security incidents;
- an assignment module, stored in the memory, that assigns a category to a new security incident by applying the supervised machine learning function to a new feature vector that describes the new security incident to predict the category for the new security incident;
- a notification module, stored in the memory, that notifies a client, through an electronically transmitted security incident report, of the new security incident and the category assigned to the new security incident based on applying the supervised machine learning function to the feature vector that describes the new security incident to enable the client to perform a security action to protect itself from a corresponding security threat; and
- at least one physical processor configured to execute the generation module, the training module, the assignment module, and the notification module;
- wherein assigning the category to the new security incident is further based at least in part on an analysis of historical data indicating that the client responded more frequently to the category than the client responded to a different category.

18. The system of claim 17, wherein the features of the feature vector further include an additional category that was previously assigned as an additional label to a threat signature alert that triggered in correspondence to a respective security incident.

19. The system of claim 18, wherein the additional category that was previously assigned as the additional label to the threat signature alert is identified by:
- identifying a historical security incident to which the threat signature alert triggered in correspondence to the historical security incident without triggering any other categorized threat signature alert; and
- leveraging a category that was previously assigned to the historical security incident as the additional category.

20. The system of claim 18, wherein the additional category that was previously assigned as the additional label to the threat signature alert is identified by extracting the additional category from a multi-level hierarchical category taxonomy that assigns to the threat signature alert both the additional category and a sub-category under the additional category.

* * * * *